United States Patent
Kwon et al.

(10) Patent No.: US 11,153,725 B2
(45) Date of Patent: Oct. 19, 2021

(54) METHOD AND SYSTEM FOR SENDING BULK NOTIFICATIONS

(71) Applicant: NAVER CORPORATION, Seongnam-si (KR)

(72) Inventors: Taekwan Kwon, Seongnam-si (KR); Jungyoung Park, Seongnam-si (KR); Seungmin Park, Seongnam-si (KR)

(73) Assignee: NAVER CORPORATION, Seongnam-si (KR)

( * ) Notice: Subject to any disclaimer, the term of this patent is extended or adjusted under 35 U.S.C. 154(b) by 0 days.

(21) Appl. No.: 16/796,357

(22) Filed: Feb. 20, 2020

(65) Prior Publication Data

US 2021/0120378 A1 Apr. 22, 2021

(30) Foreign Application Priority Data

Oct. 16, 2019 (KR) .......................... 10-2019-0128401

(51) Int. Cl.
*H04W 4/08* (2009.01)
*H04W 4/12* (2009.01)
(Continued)

(52) U.S. Cl.
CPC .............. *H04W 4/08* (2013.01); *H04W 4/12* (2013.01); *H04W 8/18* (2013.01); *H04W 68/005* (2013.01); *H04W 88/184* (2013.01)

(58) Field of Classification Search
CPC ... H04L 67/26; H04L 12/1895; H04L 12/185; H04L 12/1859; H04L 51/24; H04L 51/32;
(Continued)

(56) References Cited

U.S. PATENT DOCUMENTS

2004/0221012 A1* 11/2004 Heumesser .......... G06Q 10/107
709/206
2017/0289287 A1* 10/2017 Modi ................ G06F 16/24578

FOREIGN PATENT DOCUMENTS

KR 1020020019495 A 3/2002
KR 1020060047882 A 5/2006
(Continued)

OTHER PUBLICATIONS

Office Action issued by the Korean Patent Office corresponding to Korean patent application No. 10-2019-0128401 dated Sep. 1, 2020.
(Continued)

*Primary Examiner* — Quoc Thai N Vu
(74) *Attorney, Agent, or Firm* — Greer Burns & Crain Ltd.

(57) ABSTRACT

A bulk notification sending method includes, in response to sending a notification for providing content through a plurality of channels, retrieving subscribers of the channels connected to the content from a sending target database including information about subscribers for each channel; in response to a retrieved subscriber being a subscriber of a first channel among the channels, storing an identification value of the retrieved subscriber in each of a first storage for storing a sending target and a second storage for a redundancy removal and processing sending of a notification to the retrieved subscriber; and in response to the retrieved subscriber not being the subscriber of the first channel, retrieving the identification value of the retrieved subscriber from the second storage and determining whether to send the notification to the retrieved subscriber depending on whether the identification value of the retrieved subscriber is stored in the second storage.

17 Claims, 8 Drawing Sheets

(51) Int. Cl.
*H04W 8/18* (2009.01)
*H04W 68/00* (2009.01)
*H04W 88/18* (2009.01)

(58) Field of Classification Search
CPC ..... H04L 51/34; H04M 2242/04; H04W 4/08; H04W 4/12; H04W 68/005; H04W 8/18; H04W 88/184; H04W 76/11; H04W 76/40; G06F 16/215; G06F 16/22
See application file for complete search history.

(56) References Cited

FOREIGN PATENT DOCUMENTS

| KR | 1020150031170 A | 3/2015 |
| KR | 1020180072888 A | 7/2018 |

OTHER PUBLICATIONS

Send notifications to 10 million users in 1 minute (optimizing parallel processes); Jan. 2, 2019 https://taetaetae.github.io/2019/01/02/faster-parallel-processes/#.

* cited by examiner

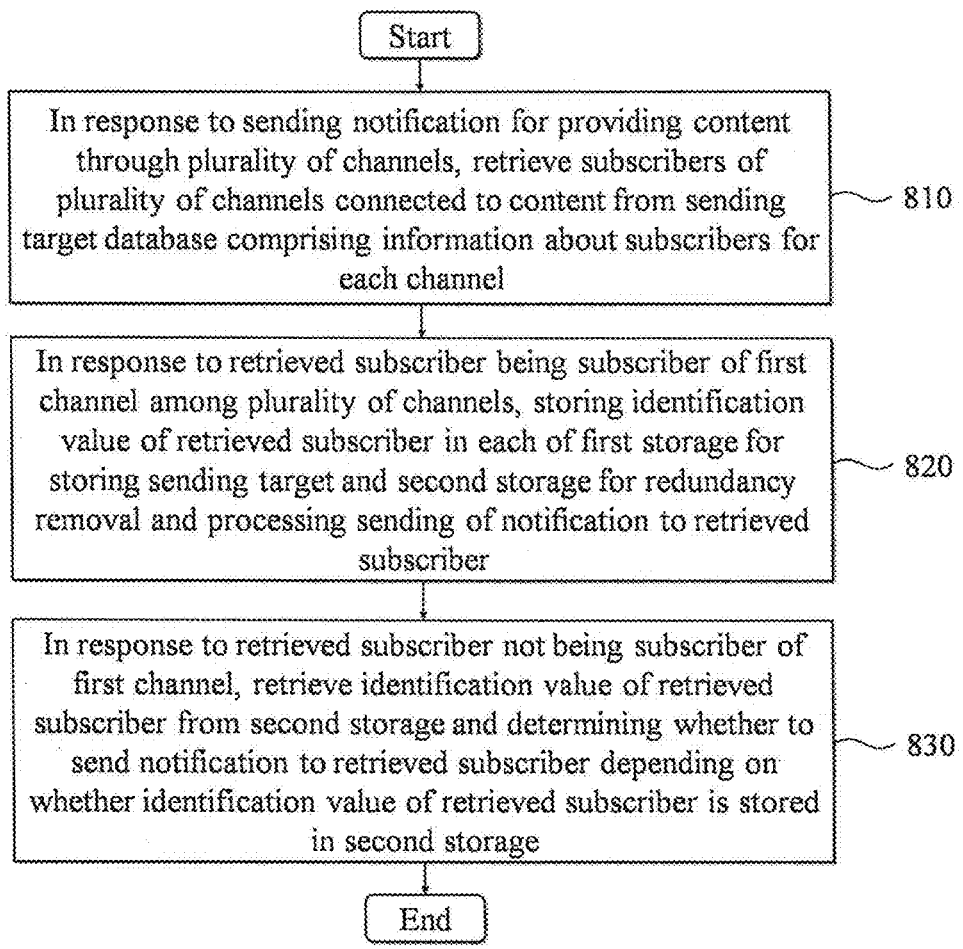

METHOD AND SYSTEM FOR SENDING BULK NOTIFICATIONS

CROSS-REFERENCE TO RELATED APPLICATION(S)

This U.S. non-provisional application claims the benefit of priority under 35 U.S.C. § 119 to Korean Patent Application No. 10-2019-0128401 filed on Oct. 16, 2019, in the Korean Intellectual Property Office (KIPO), the entire contents of which are incorporated herein by reference.

BACKGROUND OF THE INVENTION

Field of Invention

One or more example embodiments of the following description relate to a method and system for sending bulk notifications.

Description of Related Art

There are technologies for sending a notification to a plurality of users. For example, a method for sending a push notification and a push notification server performing the same are described in Korean Patent Laid-Open Publication No. 10-2015-0031170. Here, the push notification server receives a push notification message from a push notification server application and sends the push notification message to a registered push notification client in association with the push notification server application.

A method of sequentially sending a notification message to specific users may be used as a notification sending method. However, in such a method, an amount of time used to forward a notification to all of the users may linearly increase according to an increase in a number of specific users.

Further, a single notification may be associated with a plurality of channels and each of at least a portion of users may use a plurality of channels. In this case, a notification with the same contents may be redundantly sent to the same user through the plurality of channels. For example, it is assumed that a channel is present for each specific celebrity, for example, a singer. A user A subscribes to a channel A for a singer 1, a channel B for a singer 2, and a channel C for a singer 3. With this assumption, if all of the singer 1, the singer 2, and the singer 3 attend the year-end awards, the same notification about the year-end awards is sent to the user A three times through the channel A, the channel B, and the channel C.

BRIEF SUMMARY OF THE INVENTION

One or more example embodiments provide a bulk notification sending method and system that may improve a notification sending speed and may reduce an overall time used to send bulk notifications.

One or more example embodiments also provide a bulk notification sending method and system that may reduce an overall time used to send bulk notifications by changing a configuration of a server, compared to a general method of increasing a number of servers or improving a server performance to enhance a notification sending performance.

According to an aspect of at least one example embodiment, there is provided a bulk notification sending method of a computer apparatus including at least one processor, the method including: by the at least one processor, in response to sending a notification for providing content through a plurality of channels, retrieving subscribers of the plurality of channels connected to the content from a sending target database including information about subscribers for each channel; in response to a retrieved subscriber being a subscriber of a first channel among the plurality of channels, storing an identification value of the retrieved subscriber in each of a first storage for storing a sending target and a second storage for a redundancy removal and processing sending of a notification to the retrieved subscriber; and in response to the retrieved subscriber not being the subscriber of the first channel, retrieving the identification value of the retrieved subscriber from the second storage and determining whether to send the notification to the retrieved subscriber depending on whether the identification value of the retrieved subscriber is stored in the second storage.

The determining whether to send the notification may include determining to skip sending of the notification to the retrieved subscriber in response to the identification value of the retrieved subscriber being stored in the second storage, and determining to send the notification to the retrieved subscriber in response to the identification value of the retrieved subscriber not being stored in the second storage.

The sending target database may include a channel-by-channel subscriber table in which subscribers for each channel are sorted in ascending order.

The retrieving of the subscribers may include: classifying indices of the subscribers; and retrieving the subscribers in parallel with respect to groups of the classified indices.

The retrieving of the subscribers may include: classifying indices of the subscribers based on a first unit; classifying each of the indices classified based on the first unit based on a second unit; and retrieving the subscribers in parallel with respect to groups of the indices classified based on the second unit.

The first unit may be greater than the second unit.

The bulk notification sending method may further include: by the at least one processor, tracking a number of sending targets through the first storage. The retrieving of the subscribers in parallel may include: verifying a change in the number of sending targets per preset time; and in response to an absence of the change in the number of sending targets, determining that sending of the notification to subscribers of a single channel is completed and retrieving subscribers of a subsequent channel to proceed with sending of a notification to the subscribers of the subsequent channel.

At least one of the first storage and the second storage may include a key-value storage having a volatility and a permanence.

At least one of the first storage and the second storage may be partitioned into c keys each having b values with respect to a number of the subscribers that is $a=bc$, where each of a, b, and c denotes a natural number.

The bulk notification sending method may further include: by the at least one processor, setting a delay time for each content; and delaying a request of the notification by the delay time set for each content and forwarding the request of the notification to a push send platform.

The bulk notification sending method may further include: by the at least one processor, forwarding a request of the notification to a push send platform using an asynchronous call method.

According to an aspect of at least one example embodiment, there is provided a bulk notification sending method of a computer apparatus including at least one processor, the method including: by the at least one processor, in response to sending a notification for providing content through a plurality of channels, retrieving subscribers of at least one channel connected to the content from a sending target database including information about subscribers for each channel; processing sending of a notification to subscribers of a first channel among the plurality of channels; and processing sending of a notification to subscribers of a subsequent channel among the plurality of channels and skipping sending of a notification to subscribers corresponding to sending of a redundant notification.

According to an aspect of at least one example embodiment, there is provided a non-transitory computer-readable record medium storing computer instructions that, when executed by a processor, cause the processor to perform the bulk notification sending method described above.

According to an aspect of at least one example embodiment, there is provided a computer apparatus including: at least one processor configured to execute computer-readable instructions. The at least one processor is further configured to, in response to sending a notification for providing content through a plurality of channels, retrieve subscribers of the plurality of channels connected to the content from a sending target database including information about subscribers for each channel, in response to a retrieved subscriber being a subscriber of a first channel among the plurality of channels, store an identification value of the retrieved subscriber in a first storage for storing a sending target and a second storage for a redundancy removal and process sending of a notification to the retrieved subscriber, and in response to the retrieved subscriber not being the subscriber of the first channel, retrieve the identification value of the retrieved subscriber from the second storage and determine whether to send the notification to the retrieved subscriber depending on whether the identification value of the retrieved subscriber is stored in the second storage.

According to an aspect of at least one example embodiment, there is provided a computer apparatus including at least one processor configured to execute computer-readable instructions. The at least one processor is further configured to, in response to sending a notification for providing content through a plurality of channels, retrieve subscribers of at least one channel connected to the content from a sending target database including information about subscribers for each channel, process sending of a notification to subscribers of a first channel among the plurality of channels, and process sending of a notification to subscribers of a subsequent channel among the plurality of channels and skip sending of a notification to subscribers corresponding to sending of a redundant notification.

According to some example embodiments, it is possible to improve a notification sending speed and to reduce an overall time used to send bulk notifications.

Also, according to some example embodiments, it is possible to reduce an overall time used to send bulk notifications by changing a configuration of a server, compared to a general method of increasing a number of servers or improving a server performance to enhance a notification sending performance.

Also, according to some example embodiments, since a service server collects a plurality of notifications and forwards the plurality of notifications to a push send platform using an asynchronous method, it is possible to reduce network cost incurred insignificantly and an unnecessary standby time for notification sending.

Also, according to some example embodiments, it is possible to immediately start to send a notification by performing a sending target verification, that is, a verification of redundancy, and a notification sending in parallel and, accordingly, to reduce the amount of time used to verify a sending target to remove sending of a redundant notification.

Also, according to some example embodiments, it is possible to improve an operation processing speed and to improve a notification sending speed by introducing a double parallel processing (DPP) for a small unit of parallel operation.

Also, according to some example embodiments, it is possible to reduce load occurring in an interacting push send platform due to an accelerated sending speed by delaying and sending a notification based on a delay time, for example, n milliseconds, set for each content.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Example embodiments will be described in more detail with regard to the figures, wherein like reference numerals refer to like parts throughout the various figures unless otherwise specified, and wherein:

FIG. 8 is a flowchart illustrating an example of a bulk notification sending method according to an example embodiment.

Figure 1:
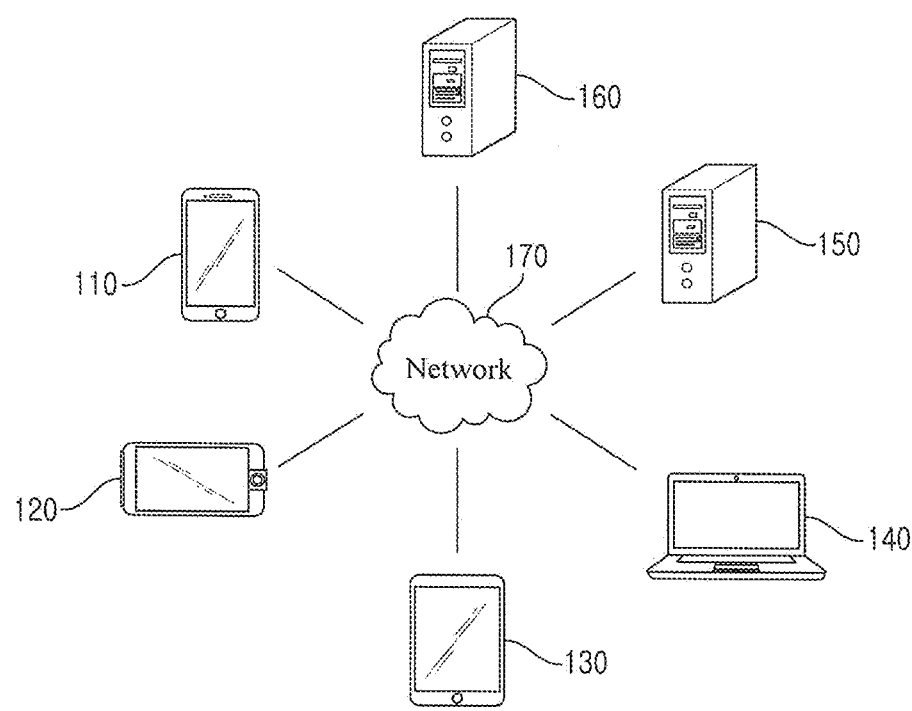
FIG. 1 illustrates an example of a network environment according to an example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION OF THE INVENTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable storage mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blue-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

A bulk notification sending system according to example embodiments may be configured using at least one computer apparatus. A bulk notification sending method according to example embodiments may be performed through the at least one computer apparatus included in the bulk notification sending system. Here, a computer program according to example embodiments may be installed and executed on the computer apparatus and the computer apparatus may perform the bulk notification sending method under control of the executed computer program. The computer program may be stored in a non-transitory computer-readable record medium to perform the bulk notification sending method in conjunction with the computer apparatus.

FIG. 1 is a diagram illustrating an example of a network environment according to an example embodiment. Referring to FIG. 1, the network environment includes a plurality of electronic devices 110, 120, 130, 140, a plurality of servers 150, 160, and a network 170. FIG. 1 is provided as an example only and thus, a number of electronic devices and/or a number of servers are not limited thereto. Also, the network environment of FIG. 1 is merely provided to describe an example of environments applicable to the example embodiments and an environment applicable to the example embodiments is not limited to the network environment of FIG. 1.

Each of the plurality of electronic devices 110, 120, 130, 140 may be a fixed terminal or a mobile terminal configured as a computer apparatus. For example, the plurality of electronic devices 110, 120, 130, 140 may be a smartphone, a mobile phone, a navigation device, a computer, a laptop computer, a digital broadcasting terminal, a personal digital assistant (PDA), a portable multimedia player (PMP), a tablet personal computer (PC), and the like. For example, although FIG. 1 illustrates a shape of a smartphone as an example of the electronic device 110, the electronic device 110 may refer to one of various physical computer apparatuses capable of communicating with other electronic devices 120, 130, and 140, and/or the servers 150, 160 over the network 170 in a wired communication manner or in a wireless communication manner.

The communication scheme is not particularly limited and may include a communication method using a near field communication between devices as well as a communication method using a communication network, for example, a mobile communication network, the wired Internet, the wireless Internet, a broadcasting network, etc., which may be included in the network 170. For example, the network 170 may include at least one of network topologies that include, for example, a personal area network (PAN), a local area network (IAN), a campus area network (CAN), a metropolitan area network (MAN), a wide area network (WAN), a broadband network (BBN), and the Internet. Also, the network 170 may include at least one of network topologies that include a bus network, a star network, a ring network, a mesh network, a star-bus network, a tree or hierarchical network, and the like. However, it is only an example and the example embodiments are not limited thereto.

Each of the servers 150, 160 may be configured as a computer apparatus or a plurality of computer apparatuses that provides instructions, codes, files, contents, services, and the like through communication with the plurality of electronic devices 110, 120, 130, 140 over the network 170. For example, the server 150 may be a system that provides a service to the plurality of electronic devices 110, 120, 130, 140 connected over the network 170. Here, the service may be, for example, a group call service or a voice conference service, a messaging service, a mail service, a social network service (SNS), a map service, a translation service, a financial service, a payment service, a search service, a content providing service, and the like.

Figure 2:
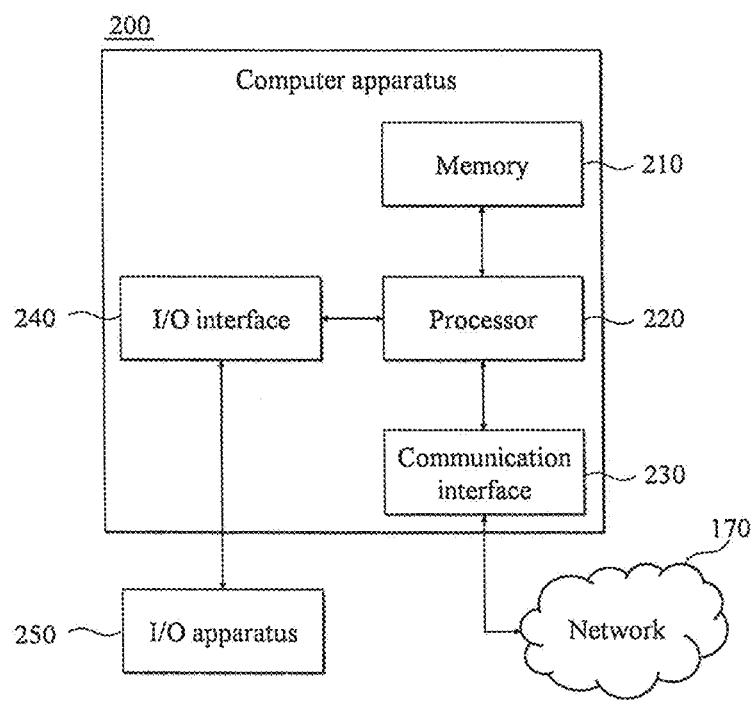
FIG. 2 illustrates an example of a computer apparatus according to an example embodiment.

FIG. 2 is a block diagram illustrating an example of a computer apparatus 200 according to an example embodiment. Each of the plurality of electronic devices 110, 120, 130, 140 or each of the servers 150, 160 may be configured by a computer apparatus 200 of FIG. 2.

Referring to FIG. 2, the computer apparatus 200 may include a memory 210, a processor 220, a communication interface 230, and an input/output (I/O) interface 240. The memory 210 may include a permanent mass storage device, such as random access memory (RAM), a read only memory (ROM), and a disk drive, as a non-transitory computer-readable storage medium. The permanent mass storage device, such as ROM and disk drive, may be included in the computer apparatus 200 as a permanent storage device separate from the memory 210. Also, an OS or at least one program code may be stored in the memory 210. The software components may be loaded to the memory 210 from another non-transitory computer-readable medium separate from the memory 210. The other non-transitory computer-readable storage medium may include a non-transitory computer-readable storage medium, for example, a floppy drive, a disk, a tape, a DVD/CD-ROM drive, a memory card, etc. According to other example embodiments, software components may be loaded to the memory 210 through the communication interface 230 instead of, or in addition to, the non-transitory computer-readable storage medium. For example, software components may be loaded to the memory 210 of the computer apparatus 200 based on a computer program installed by files received over the network 170.

The processor 220 may be configured to process computer-readable instructions of a computer program by performing basic arithmetic operations, logic operations, and I/O operations. The computer-readable instructions may be provided from the memory 210 or the communication interface 230 to the processor 220. For example, the processor 220 may be configured to execute received instructions in response to the program code stored in the storage device, such as the memory 210.

The communication interface 230 may provide a function for communication between the computer apparatus 200 and another apparatus, for example, the aforementioned storage devices, over the network 170. For example, the processor 220 of the electronic apparatus 200 may transfer data, a file, a request or an instruction created based on a program code stored in the storage device, such as the memory 210, to other apparatuses over the network 170 under control of the communication interface 230. Inversely, a signal, an instruction, data, a file, etc., from the other apparatus may be received at the computer apparatus 200 through the communication module 230 of the computer apparatus 200 by going through the network 170. For example, a signal, an instruction, data, etc., received through the communication interface 230 may be transferred to the processor 220 or the memory 210, and a file, etc., may be stored in a storage medium, for example, the permanent mass storage device, further includable in the computer apparatus 200.

The I/O interface 240 may be a device used for interface with an I/O apparatus 250. For example, an input device of the I/O apparatus 250 may include a device, such as a microphone, a keyboard, a mouse, and the like, and an output device of the I/O apparatus 250 may include a device, such as a display, a speaker, and the like. As another example, the I/O interface 240 may be a device for interface with an apparatus in which an input function and an output function are integrated into a single function, such as a touchscreen. The I/O apparatus 250 may be configured as a single apparatus with the computer apparatus 200.

According to other example embodiments, the electronic device 200 may include a number of components greater than or less than a number of components shown in FIG. 2. However, there is no need to clearly illustrate many components according to the related art. For example, the computer apparatus 200 may include at least a portion of the I/O apparatus 250, or may further include other components, for example, a transceiver, a database (DB), and the like.

Figure 3:
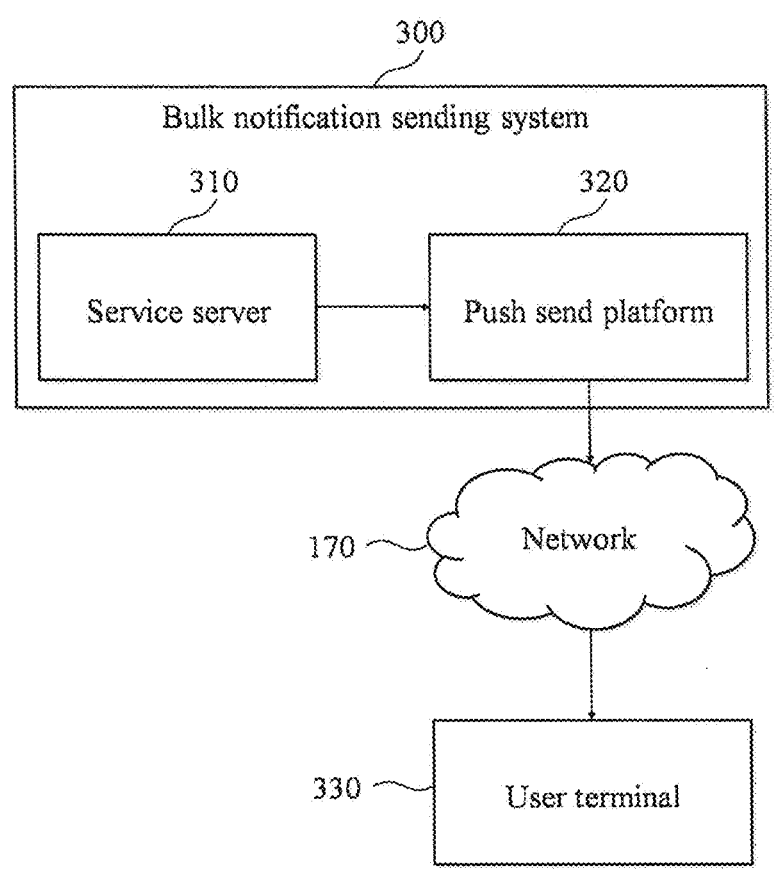
FIG. 3 illustrates an example of a flow of forwarding of a notification to a user according to an example embodiment.

FIG. 3 illustrates an example of a flow of forwarding of a notification to a user according to an example embodiment. Referring to FIG. 3, a bulk notification sending system 300 may include a service server 310 and a push send platform 320. Depending on example embodiments, the bulk notification sending system 300 may use a separate external push send platform, instead of using the push send platform 320. The bulk notification sending system 300 may be implemented in at least one computer apparatus such as the computer apparatus 200. For example, the service server 310 and the push sending platform 320 may be implemented in different computer devices, or may be implemented together in one computer device.

The service server 310 may combine a sending target to which a notification about content is to be forwarded and information to be sent through the notification, and may forward the notification to the push send platform 320, and the push send platform 320 may send the notification over the network 170 to a user terminal 330 in the form of any of the electronic devices 110, 120, 130, 140 shown in FIG. 1.

Here, the term "sending target" used herein refers to a target to which a notification about providing content is to be sent and may include a subscriber of a channel to which the content is to be provided. Herein, the term "subscriber" may be represented as a user of a channel. Also, a "sending time" for a single notification may indicate a duration of time from a point in time at which the service server 310 initially starts to send a notification to a point in time at which the service server 310 requests the push send platform 320 to send a notification to the last sending target. If the service server 310 requests the push send platform 320 to send a notification for each sending target, a sending time may increase to be proportional to a number of sending targets.

According to an example embodiment, the service server 310 may request the push send platform 320 to send notifications in parallel and may reduce the sending time.

Figure 4:
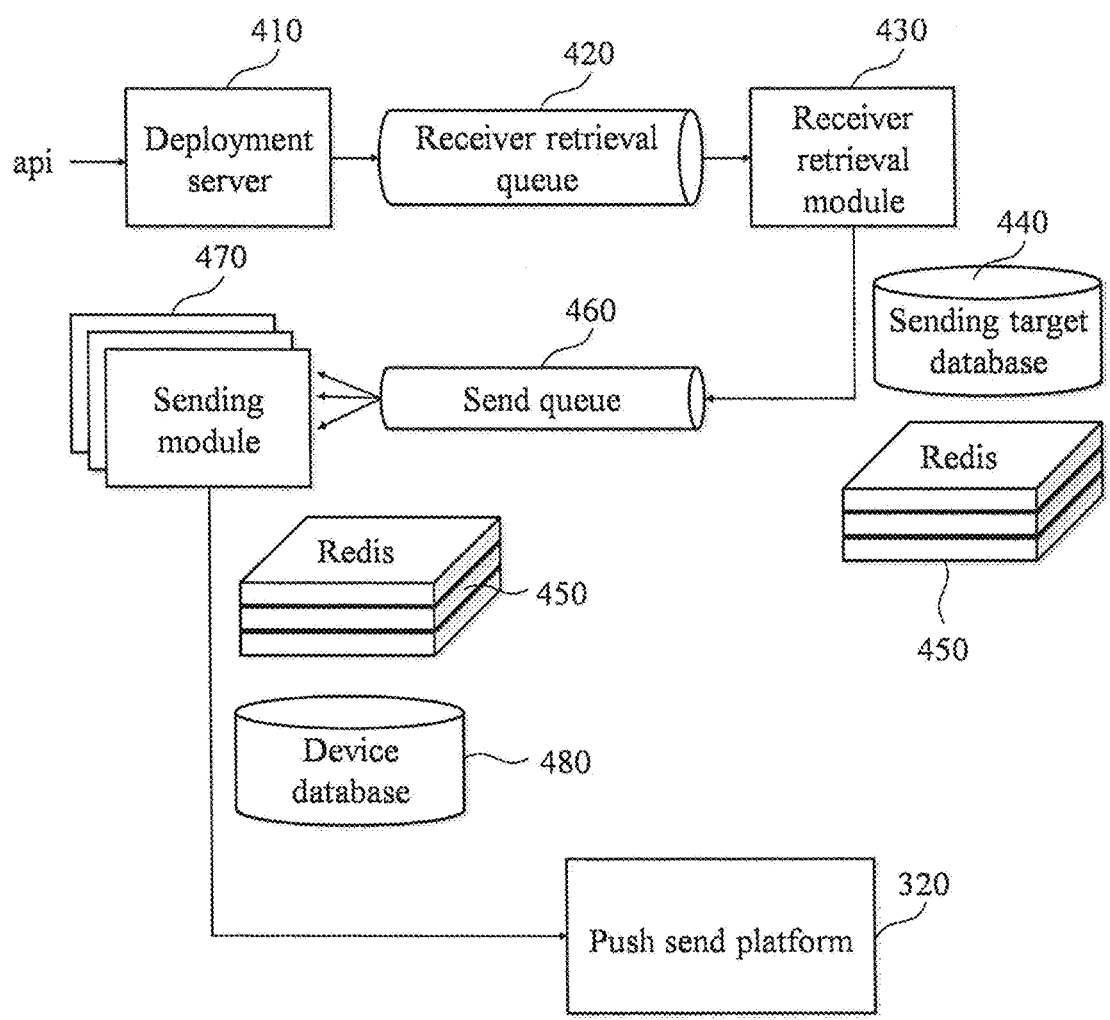
FIG. 4 illustrates an example of a process of requesting, at a service server, a push send platform to send a notification according to an example embodiment.

FIG. 4 illustrates an example of a process of requesting, by the service server 310, to send a notification to a push send platform according to an example embodiment. FIG. 4 illustrates an example of a process in which the service server 310 forwards a request for sending a notification about content, for example, video content, to the push send platform 320. Referring to FIG. 4, a deployment server 410, a receiver retrieval queue 420, a receiver retrieval module 430, a sending target database 440, a remote dictionary server (Redis) 450, a send queue 460, a sending module 470, and a device database 480 may be components included in the service server 310 of FIG. 3.

When a live broadcast of a video starts or a video on demand (VOD) of the video is open, application programming interface (API) is called and a unique number of the video may be forwarded to the deployment server 410. Here, the deployment server 410 may produce the unique number of the video to the receiver retrieval queue 420. The deployment server 410 may be configured as, for example, a Jenkins server. Here, queues described herein may be configured as a form of open source message broker software such as "RabbitMQ". Such "RabbitMQ" may be a message delivery broker using a publish/subscribe method in which, if a producer of producing a message stores, that is, produces the message in a queue, a consumer of receiving a message obtains and processes the message. For example, if the deployment server 410 stores a unique number of a video in the receiver retrieval queue 420 as a producer, the receiver retrieval module 430 that is a consumer of the receiver retrieval queue 420 may consume, that is, obtain and process, the unique number of the video stored in the receiver retrieval queue 420 and then may perform the following processes (1-1) to (1-3).

(1-1) Since a video and a channel are in a 1:N structure, a notification may be sent to sending targets of a plurality of channels for a video. In this case, the receiver retrieval module 430 may retrieve users of channels connected to the video from the sending target database 440. The sending target database 440 may store a channel, for example, an identifier (ID) of the channel, and information, for example, a user ID, about a user that uses content through the channel to be associated with each other. Here, the receiver retrieval module 430 may verify the channel connected to the video and may verify users stored in association with the verified channel as sending targets from the sending target database 440.

(1-2) The receiver retrieval module 430 may remove a duplicate user by storing information about the retrieved users in a data structure such as a java set to prevent a notification from being redundantly sent to the retrieved users. In this case, the receiver retrieval module 430 may store information (information in which a duplicate user is removed and accordingly, also referred to as a redundancy removed information) about the retrieved users as a sorted set in the Redis 450 with respect to all of the channels connected to the video. Here, the Redis 450 refers to a key-value storage having a volatility and a permanence and is used as an example of a storage configured to store information about the retrieved users, that is, redundancy removed information. Here, a sending target key for a user may be stored as a sorted set in the Redis 450.

(1-3) The receiver retrieval module 430 may classify information about the retrieved users based on a preset size and may store the classified information in the send queue 460.

Meanwhile, the sending module 470 may perform the following processes (2-1) and (2-2) described below as a consumer of the send queue 460. Here, the sending module 470 may include a plurality of modules. The plurality of modules may perform the process of (2-1) and (2-2) in parallel based on a unit of the classified information, which may lead to reducing a sending time.

(2-1) The sending module 470 may retrieve information about the users (redundancy removed information) from the Redis 450.

(2-2) The sending module 470 may retrieve a device ID corresponding to each of the retrieved users from the device database 480.

The sending module 470 may configure an appropriate payload using a device ID and content information, for example, details of the notification, and may forward the payload to the push send platform 320.

Here, the sending module 470 of the service server 310 requests the push send platform 320 to send a notification and then simply processes only logging of a sending time based on a type of a response, for example, a success or a failure and does not need to wait for the response. Therefore, in the example embodiment, the sending module 470 may request the push send platform 320 to send a notification using an asynchronous call method. Although the push send platform 320 responds to the request within 1 to 2 seconds, a time in which the sending module 470 waits for the response increases to be proportional to a number of sending targets. Therefore, the sending time may be reduced using the asynchronous call method. For example, a java class "AsyncRestTemplate" may be used for the asynchronous call method.

The following Table 1 shows an example of the amount of time used to send the first notification and the amount of time used to send the last notification based on whether the asynchronous call method is used.

TABLE 1

| Item | Existing | First (asynchronous call method) |
|---|---|---|
| Number of sending targets | about 10,530,000 users | about 10,570,000 users |
| First sending | about 6 minutes | about 6 minutes |
| Last sending | about 11 minutes | about 7 minutes |

Referring to Table 1, the first proposal using the asynchronous call method may reduce the amount of time used up to send the last notification, that is, may reduce a sending time by about 4 minutes compared to the existing method. In the example embodiment of FIG. 4, all of the sending targets were obtained and a notification started to be sent. Since a plurality of channels connected to a single video is present and a single user subscribes to a plurality of channels, a duplicate user needs to be removed. For example, when a channel A, a channel B, and a channel C are connected to a single video and a user subscribes to the channel A and the channel B, a notification may be sent without performing a redundancy removal. In this case, the corresponding user may receive the notification with the same content twice. If a single channel is connected to a video, there is no issue. If two or more channels are connected to a video, a notification may be redundantly sent. Therefore, the first notification may be sent only when the redundancy removal is completed. Table 1 shows that sending of the first notification is delayed by about 6 minutes due to a redundant notification removal process. Accordingly, a notification may be sent to users in the middle of the broadcast if the broadcast suddenly proceeds or when the broadcast is over if the broadcast is relatively short.

According to another example embodiment, with respect to a channel having the largest number of subscribers, once users of the channel are retrieved from the sending target database 440, a notification may be immediately sent to each of the retrieved users without performing a redundancy check and information regarding that the notification is sent to a corresponding user may be stored in a storage, for example, the Redis 450. Therefore, in the case of sending a notification to users for another channel, it is possible to skip sending of the notification to a user to which the notification is already sent based on information stored in the storage, and to reduce an amount of time used to send the first notification and an amount of time used to send the last notification accordingly.

Figure 5:
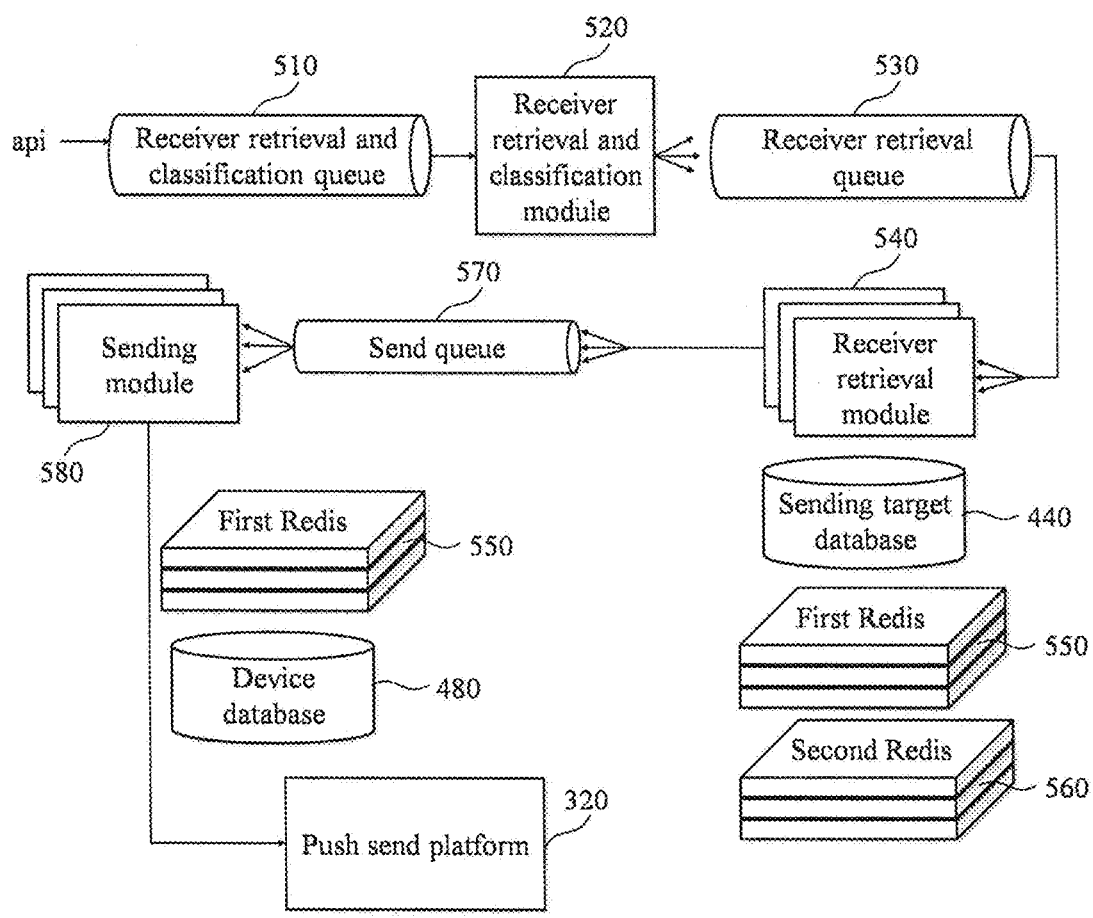
FIG. 5 illustrates another example of a process of requesting, at a service server, a push send platform to send a notification according to an example embodiment.

FIG. 5 illustrates another example of a process of requesting, at the service server 310, the push send platform 320 to send a notification according to an example embodiment. Referring to FIG. 5, a receiver retrieval and classification queue 510, a receiver retrieval and classification module 520, a receiver retrieval queue 530, a receiver retrieval module 540, a sending target database 440, a first Redis 550, a second Redis 560, a send queue 570, a sending module 580, and a device database 480 may be components included in the service server 310 of FIG. 3.

In the example embodiment of FIG. 4, the deployment server 410 serves to trigger sending of a notification. Here, when the deployment server 410 is configured as a Jenkins server, an instance driving time of 20 to 30 seconds is basically present in response to a call of "Jenkins remote API" in API. The instance driving time unnecessarily increases the sending time. Therefore, in the example embodiment of FIG. 5, API may immediately store a unique number of a video in the receiver retrieval and classification queue 510.

The receiver retrieval and classification module 520 may obtain the unique number and may classify indices of users for sending a message based on an appropriate size. For example, the receiver retrieval and classification module 520 may classify a start index and an end index for each group of indices and may produce the classified indices to the receiver retrieval queue 530. Here, the receiver retrieval queue 530 may include a plurality of queues. Also, the receiver retrieval module 540 that is a consumer of the receiver retrieval queue 530 may include a plurality of modules. In this case, the following process (3-1) to (3-3) may be performed in parallel through the plurality of modules included in the receiver retrieval module 540.

(3-1) Each of the modules included in the receiver retrieval module 540 may obtain information about a user corresponding to a sending target from the sending target database 440.

(3-2) If a retrieved user is a user of a first channel, for example, a channel having the largest number of subscribers, each of the modules included in the receiver retrieval module 540 may store a value of the corresponding user, for example, an ID of the user, in a sending target key of the first Redis 550 and a redundancy removal key of the second Redis 560. The receiver retrieval module 540 may store information about the user in the send queue 570.

(3-3) If the retrieved user is not the user of the first channel, the receiver retrieval module 540 needs to perform a redundancy removal. Therefore, the receiver retrieval module 540 may collect only a user to which a notification is not sent using a zscore operation (time complexity O(1)) of the second Redis 560, may store values of the collected users in the sending target key of the first Redis 550, and may store information about the user in the send queue 570.

For example, a value of a user to which a notification is sent is stored in the redundancy removal key of the second Redis 560. Therefore, sending of a redundant notification may be prevented by skipping or sending a notification to the retrieved user depending on whether the value of the retrieved user is stored in the redundancy removal key of the second Redis 560.

Meanwhile, the sending module 580 may perform the following processes (4-1) and (4-2) as a consumer of the send queue 570. Here, the sending module 580 may include a plurality of modules. The plurality of modules may perform the processes (4-1) and (4-2) in parallel based on a unit of the classified information, which may lead to reducing a sending time.

(4-1) The sending module 580 may retrieve information about the users (redundancy removed information) from the first Redis 550.

(4-2) The sending module 580 may retrieve a device ID corresponding to each of the retrieved users from the device database 480.

The sending module 580 may configure an appropriate payload using the device ID and content information, for example, details of a notification, and may forward the payload to the push send platform 320.

In this case, the service server 310 may immediately request the push send platform 320 to send a notification once a sending target is retrieved. Therefore, it is possible to reduce a sending time and the users may start to receive a notification once a broadcast starts. The following Table 2 shows an example of the amount of time used to send the first notification and the amount of time used to send the last notification according to the existing method and the first proposal and the second proposal according to the example embodiment of FIG. 5.

TABLE 2

| Item | Existing | First | Second |
|---|---|---|---|
| Number of sending targets | about 10,530,000 users | about 10,570,000 users | about 11,120,000 users |
| First sending | about 6 minutes | about 6 minutes | about 1 second |
| Last sending | about 11 minutes | about 7 minutes | about 5 minutes 30 seconds |

Figure 6:
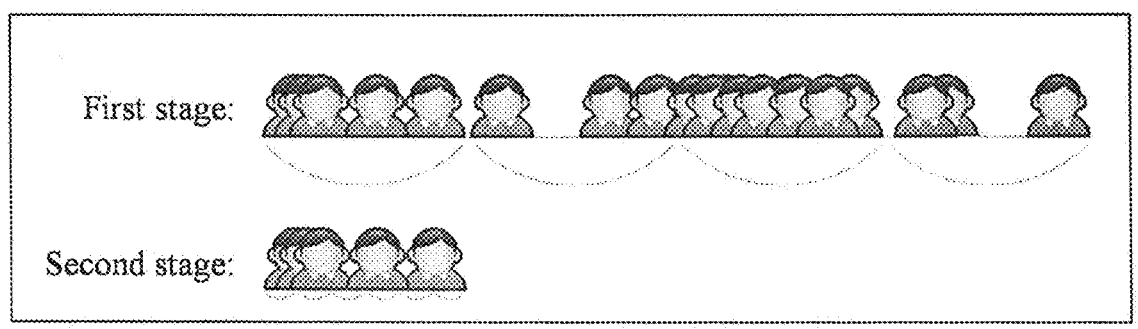
FIG. 6 illustrates an example of a double parallel processing (DPP) according to an example embodiment.

To additionally reduce a notification sending time, that is, an amount of time used to send a notification, a double parallel processing (DPP) may be used. The DPP may classify users based on a large unit and then may classify the classified users based on a small unit and thereby may increase a notification amount to be processed in parallel at a time and may reduce the sending time. FIG. 6 illustrates an example of a DPP according to an example embodiment. Referring to FIG. 6, for example, in a first stage, users are classified based on a large unit, for example, 100,000 with the assumption that the first user is 1 and the last user is 3 million. In a second stage, the users classified based on the large unit are classified based on a small unit, for example, 1000. In this case, the sending time may be reduced by retrieving users in parallel from the sending target database 440 with respect to a relatively large number of groups based on a relatively small unit.

In response to a decrease in a sending time, that is, an increase in a sending speed, load may occur in a Redis, which may cause a delay when another module uses a Redis.

The delay occurs since a Redis including a corresponding key is incapable of processing another operation based on a single thread method until an operation for a single key is terminated. To solve the above issue, Redis partitioning may be used. For example, with the assumption that 10 million users are present, 10 million users may be classified based on 10,000 and accordingly, a single Redis may be partitioned to store a total of 10,000 keys, each including 1,000 users, beyond the existing structure in which a single Redis stores 10 million keys. Accordingly, it is possible to increase a sending speed and to handle a delay issue occurring in using a Redis.

Also, if notifications are simultaneously sent through a plurality of channels, it may cause a redundant notification to be intermittently sent. A parallel process including a plurality of stages is present and each process proceeds without sequence being assured. Therefore, if a notification is sent through a redundancy check in a second process prior to verifying a redundancy check key in a first process, a notification may be redundantly sent in the first process. To prevent this, a number of sending targets may be tracked using a Redis. If the number of sending target does not change as a result of verifying a change in the number of sending target per preset time, for example, per second, it may be determined that a notification sending for a single channel is completed and a notification for a subsequent channel may start to be sent.

Figure 7:
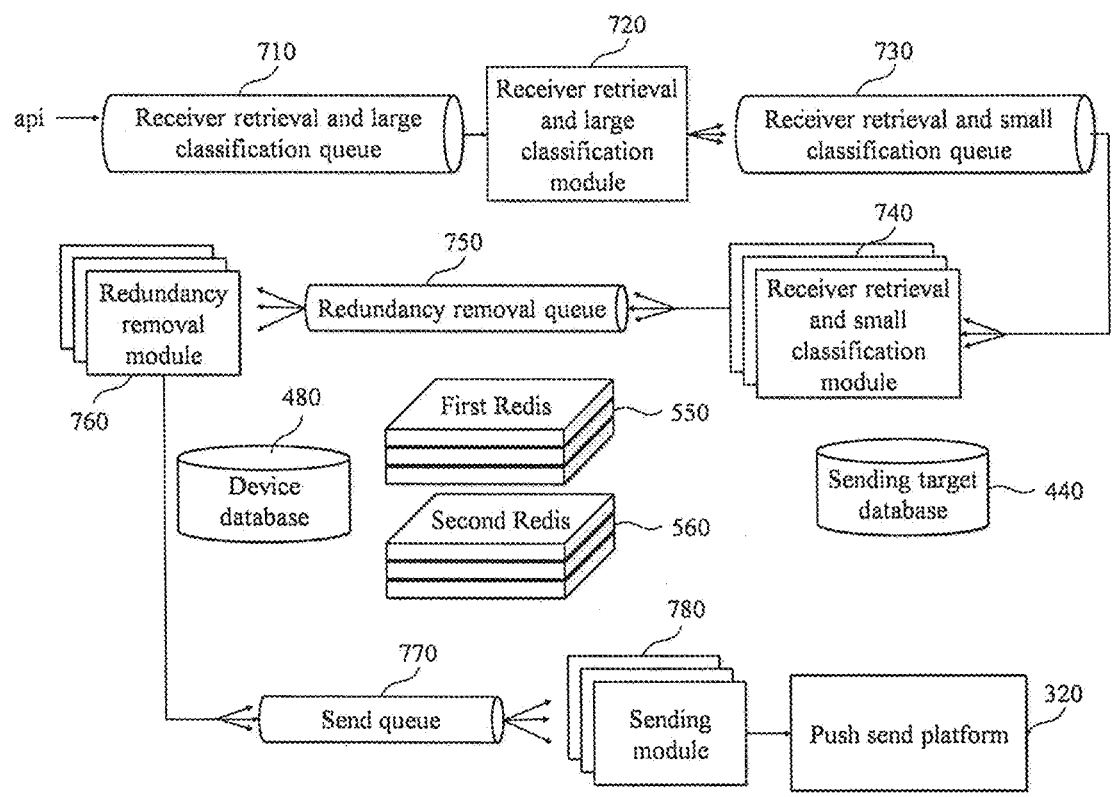
FIG. 7 illustrates another example of a process of requesting, at a service server, a push send platform to send a notification according to an example embodiment.

FIG. 7 illustrates another example of a process of requesting, at the service server 310, the push send platform 320 to send a notification according to an example embodiment. Referring to FIG. 7, a receiver retrieval and large classification queue 710, a receiver retrieval and large classification module 720, a receiver retrieval and small classification queue 730, a receiver retrieval and small classification module 740, a sending target database 440, a first Redis 550, a second Redis 560, a redundancy removal queue 750, a redundancy removal module 760, a send queue 770, a sending module 780, and a device database 480 may be components included in the service server 310 of FIG. 3.

Here, in the example embodiment of FIG. 7, once API generates a unique number of a video using the receiver retrieval and large classification queue 710, the receiver retrieval and large classification module 720 may perform partitioning for indices of users based on a large unit for each channel to enable a parallel retrieval. Partitioned indices may be stored in the receiver retrieval and small classification queue 730. Also, the receiver retrieval and large classification module 720 may serve to perform sending of a notification between channels and may process sending of a notification for a subsequent channel if there is no change in a number of sending target in the first Redis 550.

The receiver retrieval and small classification module 740 may perform partitioning for the indices based on a small unit through the receiver retrieval and small classification queue 730 and may process the following process (5-1) to (5-3).

(5-1) The receiver retrieval and small classification module 740 may retrieve a user from the sending target database 440.

(5-2) The receiver retrieval and small classification module 740 may store users in the second Redis 560 by partitioning a key based on a unit of 100,000. For example, if an index of a retrieved user is 105872, the retrieved user may be stored in "push:overlapCheck:100000" and if an index of a retrieved user is 3409572, the retrieved user may be stored in "push:overlapCheck:3400000".

(5-3) The receiver retrieval and small classification module 740 may store the retrieved user in the first Redis 550.

The retrieved users may be stored in the redundancy removal queue 750 and forwarded to the redundancy removal module 760. For a first channel, the redundancy removal module 760 may immediately send a notification through the send queue 770 and the sending module 780 without performing a redundancy check. Otherwise, the redundancy removal module 760 may determine whether to send a notification by retrieving a corresponding value from the first Redis 550 and by verifying that the corresponding value is present in a redundancy removal key of the second Redis 560. If the corresponding value is stored in the redundancy removal key of the second Redis 560, sending of a notification to a corresponding user may be skipped. Otherwise, that is, if the corresponding value is stored in the redundancy removal key of the second Redis 560, sending of the notification to the user may be processed through the send queue 770 and the sending module 780. Here, a value of the corresponding user is stored in the redundancy removal key of the second Redis 560 to represent that the notification is sent to the user.

The following Table 3 shows an example of the amount of time used to send the first notification and the amount of time used to send the last notification according to the existing method, the first proposal, and the second proposal, and the third proposal according to an example embodiment of FIG. 7.

TABLE 3

| Item | Existing | First | Second | Third |
|---|---|---|---|---|
| Number of sending targets | about 10,530,000 users | about 10,570,000 users | about 11,120,000 users | about 11,240,000 users |
| First sending | about 6 minutes | about 6 minutes | about 1 second | about 1 second |
| Last sending | about 11 minutes | about 7 minutes | about 5 minute 30 seconds | about 51 seconds |

FIG. 8 is a flowchart illustrating an example of a bulk notification sending method according to an example embodiment. The bulk notification sending method according to the example embodiment may be performed by the computer apparatus 200 of FIG. 2 that embodies a server, for example, the service server 310 of FIG. 3. In this case, the processor 220 of the computer apparatus 200 may be configured to execute a control instruction according to a code of an OS included in the memory 210 or a code of at least one computer program. Here, the processor 220 may control the computer apparatus 200 to perform operations 810 to 830 included in the method of FIG. 8 in response to a control instruction provided from a code stored in the computer apparatus 200. Here, at least one computer program may include an application, for example, a media player, configured to receive content from a server and play the content. Referring to FIG. 8, in operation 810, in response to sending a notification for providing content through a plurality of channels, the computer apparatus 200 may retrieve subscribers of the plurality of channels connected to the content from a sending target database including information about subscribers for each channel. The sending target database may correspond to the aforementioned sending target database 440 and may include information about subscribers for each channel. For example, an ID of a channel and an ID of a subscriber may be associated with each other and thereby stored in the sending target database. Here, if specific content is designated, the computer apparatus 200 may identify a plurality of channels connected to the specific content and may retrieve subscribers corresponding to the identified channels as sending targets of a notification from the sending target database.

In operation 820, in response to a retrieved subscriber being a subscriber of a first channel among the plurality of channels, the computer apparatus 200 may store an identification value of the retrieved subscriber in each of a first storage for storing a sending target and a second storage for removing a redundancy and sending a notification to the retrieved subscriber, and may process sending of a notification to the retrieved subscriber. The identification value may be, for example, an ID of the corresponding subscriber. The first storage and the second storage may correspond to the first Redis 550 and the second Redis 560 of FIG. 5 or FIG. 7, respectively. For example, at least one of the first storage and the second storage may include a key-value storage having a volatility and a permanence. Here, the first channel may represent a channel having the largest number of subscribers, that is, a channel having the largest number of subscribers in the sending target database. If the retrieved subscriber is the subscriber of the first channel, it may indicate that sending of a notification has not started and accordingly, the computer apparatus 200 may process sending of the notification to the retrieved subscriber. Here, processing sending of a notification through the computer apparatus 200 may correspond forwarding a request for sending a notification to the push send platform 320. Here, the computer apparatus 200 may forward the request for sending a notification to subscribers to the push send platform 320 using an asynchronous call method. In this manner, an amount of time used to wait for a response from the push send platform 320 may be saved.

In operation 830, in response to the retrieved subscriber not being the subscriber of the first channel, the computer apparatus 200 may retrieve the identification value of the retrieved subscriber from the second storage and may determine whether to send the notification to the retrieved subscriber depending on whether the identification value of the retrieved subscriber is stored in the second storage. For example, the computer apparatus 200 may determine to skip sending of the notification to the retrieved subscriber if the identification value of the retrieved subscriber is stored in the second storage, and may determine to send the notification to the retrieved subscriber if the identification value of the retrieved subscriber is not stored in the second storage. If the computer apparatus 200 determines to send the notification to the retrieved subscriber, the computer apparatus 200 may process sending of the notification by forwarding the request for sending the notification to the push send platform 320. Even in this case, the computer apparatus 200 may save an amount of time used to wait for a response from the push send platform 320 by forwarding the request for sending the notification to subscribers to the push send platform 320 using the asynchronous call method.

That is, the computer apparatus 200 may initially process sending of a notification to subscribers of the first channel among the plurality of channels and then may process sending of a notification to subscribers of a subsequent channel among the plurality of channels. Here, the computer apparatus 200 may skip sending of a notification to subscribers corresponding to sending of a redundant notification. Here, the computer apparatus 200 may store an identification value of each of the subscribers to which the notification is sent in a storage, may identify subscribers of which identification values are stored in the storage from among the subscribers of the subsequent channel, and may skip sending of the notification to the identified subscribers. Here, the storage may correspond to the aforementioned second storage. By continuously identifying subscribers corresponding to sending of a redundant notification from the storage with respect to at least two channels and by skipping sending of the notification to the identified subscribers, it is possible to improve a notification sending speed and to save an overall time used to send bulk notifications.

Depending on example embodiment, in operation 810, the computer apparatus 200 may classify indices of subscribers and may retrieve subscribers in parallel with respect to groups of the classified indices. For example, an example of classifying, by the receiver retrieval and classification module 520, indices of subscribers and retrieving, by the receiver retrieval module 540, the subscribers in parallel is described with reference to FIG. 5.

Also, depending on example embodiments, in operation 810, the computer apparatus 200 may classify indices of subscribers based on a first unit, may classify each of the indices classified based on the first unit based on a second unit, and may retrieve subscribers in parallel with respect to groups of the indices classified based on the second unit. Here, the first unit may be greater than the second unit. For example, an example in which, when the receiver retrieval and large classification module 720 classifies indices of subscribers, the receiver retrieval and small classification module 740 may classify again the classified indices described with reference to FIG. 7. To this end, the sending target database may include a channel-by-channel subscriber table in which subscribers for each channel are sorted in ascending order.

Also, depending on example embodiments, the computer apparatus 200 may track a number of sending targets through the first storage. Tracking the number of sending targets may be used to prevent a notification from being redundantly sent due to a sending timing between channels. For example, in the case of retrieving subscribers in parallel, the computer apparatus 200 may verify a change in the number of sending targets per preset time and may determine that sending of a notification to subscribers of a single channel is completed if the number of sending targets is not changed and may retrieve subscribers of a subsequent channel in parallel to proceed with sending of a notification to the subscribers of the subsequent channel.

Depending on example embodiments, at least one of the first storage and the second storage may be partitioned into c keys each having b values with respect to the number of subscribers that is a=bc. Here, each of a, b, and c denotes a natural number. For example, if a=10,000,000, at least one of the first storage and the second storage may be partitioned into 10,000 keys each having 1,000 values. Such storage partitioning may be performed based on a characteristic of a storage configured to process an operation using a single thread method on a single key.

The computer apparatus 200 may set a delay time for each content. Here, a request for sending a notification to subscribers may be delayed by the delay time set for each content and then forwarded to the push send platform. For example, in the case of an important broadcast, load may occur in an interacting platform, for example, the push send platform, due to a fast notification sending speed. Accordingly, a delay time, for example, n milliseconds, may be set for each content between notification requests. The computer apparatus 200 may variously control a notification sending time through the delay time.

According to some example embodiments, it is possible to improve a notification sending speed and to reduce the overall time used to send bulk notifications. Also, it is possible to reduce the overall time used to send bulk notifications by changing the configuration of a server, compared to a general method of increasing a number of servers or improving server performance to enhance a notification sending performance. Also, since a service server collects a plurality of notifications and forwards the plurality of notifications to a push send platform using an asynchronous method, it is possible to reduce significant network cost and an unnecessary standby time for notification sending. Also, it is possible to immediately start to send a notification by performing a sending target verification, that is, a verification of a redundancy, and a notification sending in parallel and, accordingly, to reduce an amount of time used to verify a sending target to remove sending of a redundant notification. Also, it is possible to improve an operation processing speed and to improve a notification sending speed by introducing a DPP for a small unit of parallel operation. Also, it is possible to reduce load occurring in an interacting push send platform due to an accelerated sending speed by delaying and sending a notification based on a delay time, for example, n milliseconds, set for each content.

The systems and/or apparatuses described herein may be implemented using hardware components, software components, and/or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to the example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments, or vice versa.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A bulk notification sending method of a computer apparatus comprising at least one processor, the method comprising:

by the at least one processor, in response to sending a notification for providing content through a plurality of content delivery channels, retrieving subscribers of the plurality of content delivery channels connected to the content from a sending target database comprising information about subscribers for each content delivery channel;

in response to a first retrieved subscriber being identified as a subscriber of a first content delivery channel among the plurality of content delivery channels, immediately sending, through the first content delivery channel, the notification to the first retrieved subscriber of the first content delivery channel, and storing an identification value of the first retrieved subscriber in each of a first storage for storing a sending target and a second storage for a redundancy removal; and in response to a second retrieved subscriber not being the subscriber of the first content delivery channel, determining to skip sending of the notification to the second retrieved subscriber in response to the identification value of the second retrieved subscriber being stored in the second storage, and determining to send the notification to the second retrieved subscriber in response to the identification value of the second retrieved subscriber not being stored in the second storage.

2. The method of claim 1, wherein the sending target database comprises a channel-by-channel subscriber table in which the subscribers for each plurality of channels are sorted in ascending order.

3. The method of claim 1, wherein the retrieving of the subscribers comprises:

classifying indices of the subscribers; and retrieving the subscribers in parallel with respect to groups of the classified indices.

4. The method of claim 1, wherein the retrieving of the subscribers comprises:
classifying indices of the subscribers based on a first unit;
classifying each of the indices classified based on the first unit based on a second unit; and
retrieving the subscribers in parallel with respect to groups of the indices classified based on the second unit.

5. The method of claim 4, wherein the first unit is greater than the second unit.

6. The method of claim 3, further comprising:
by the at least one processor,
tracking a number of sending targets through the first storage,
wherein the retrieving of the subscribers in parallel comprises:
verifying a change in the number of sending targets per preset time; and
in response to an absence of the change in the number of sending targets, determining that sending of the notification to subscribers of a single channel is completed and retrieving subscribers of a subsequent channel to proceed with sending of a notification to the subscribers of the subsequent channel.

7. The method of claim 4, further comprising:
by the at least one processor,
tracking a number of sending targets through the first storage,
wherein the retrieving of the subscribers in parallel comprises:
verifying a change in the number of sending targets per preset time; and
in response to an absence of the change in the number of sending targets, determining that sending of the notification to subscribers of a single channel is completed and retrieving subscribers of a subsequent channel to proceed with sending of the notification to the subscribers of the subsequent channel.

8. The method of claim 1, wherein at least one of the first storage and the second storage comprises a key-value storage having volatility and permanence.

9. The method of claim 1, wherein at least one of the first storage and the second storage is partitioned into c keys each having b values with respect to a number of the subscribers that is a=bc, where each of a, b, and c denotes a natural number.

10. The method of claim 1, further comprising:
by the at least one processor,
setting a delay time for each content; and
delaying a request of the notification by the delay time set for each content and forwarding the request of the notification to a push send platform.

11. The method of claim 1, further comprising:
by the at least one processor,
forwarding a request of the notification to a push send platform using an asynchronous call method.

12. A non-transitory computer-readable record medium storing computer instructions that, when executed by a processor, cause the processor to perform the bulk notification sending method of claim 1.

13. The method of claim 1, wherein the first content delivery channel is selected from among the plurality of content delivery channels having a largest number of subscribers.

14. A computer apparatus comprising:
at least one processor configured to execute computer-readable instructions,
wherein the at least one processor is further configured to,
in response to sending a notification for providing content through a plurality of content delivery channels, retrieve subscribers of the plurality of content delivery channels connected to the content from a sending target database comprising information about subscribers for each content delivery channel;
in response to a first retrieved subscriber being identified as a subscriber of a first content delivery channel among the plurality of content delivery channels, immediately sending, through the first content delivery channel, the notification to the first retrieved subscriber of the first content delivery channel, and store an identification value of the first retrieved subscriber in a first storage for storing a sending target and a second storage for a redundancy removal; and
in response to a second retrieved subscriber not being the subscriber of the first content delivery channel, skip sending of the notification to the second retrieved subscriber in response to the identification value of the retrieved second subscriber being stored in the second storage, and send the notification to the second retrieved subscriber in response to the identification value of the retrieved second subscriber not being stored in the second storage.

15. The computer apparatus of claim 14, wherein the at least one processor is further configured to,
classify indices of the subscribers, and
retrieve the subscribers in parallel with respect to groups of the classified indices.

16. The computer apparatus of claim 14, wherein the at least one processor is further configured to,
classify indices of the subscribers based on a first unit,
classify each of the indices classified based on the first unit based on a second unit, and
retrieve the subscribers in parallel with respect to groups of the indices classified based on the second unit.

17. The computer apparatus of claim 14, wherein the first content delivery channel is selected from among the plurality of content delivery channels having a largest number of subscribers.

* * * * *